United States Patent
Carroll et al.

(10) Patent No.: US 6,315,070 B1
(45) Date of Patent: Nov. 13, 2001

(54) SNOWMOBILE TRACK REPAIR SYSTEM, APPARATUS AND METHOD

(75) Inventors: Brian E. Carroll, Niskayuna; Peter F. Poutre, Albany, both of NY (US)

(73) Assignee: Carroll Tech, Inc., Nishayuna, NY (US)

( * ) Notice: Subject to any disclaimer, the term of this patent is extended or adjusted under 35 U.S.C. 154(b) by 0 days.

(21) Appl. No.: 09/248,301

(22) Filed: Feb. 11, 1999

(51) Int. Cl.$^7$ .................................. B62D 55/32
(52) U.S. Cl. ............................ 180/190; 305/165
(58) Field of Search .................. 180/190; 305/165; 156/94, 97, 98; 425/12

(56) References Cited

U.S. PATENT DOCUMENTS

| | | |
|---|---|---|
| 2,955,065 * | 10/1960 | Paul ........................................ 156/98 |
| 3,016,319 * | 1/1962 | Halverscheid .......................... 156/98 |
| 3,781,067 * | 12/1973 | Dodson et al. ................... 305/35 EB |
| 3,865,662 * | 2/1975 | Seal ........................................ 156/94 |
| 3,969,051 | 7/1976 | Hovila . |
| 3,979,169 | 9/1976 | Whittle . |
| 4,063,986 | 12/1977 | Eaton et al. . |
| 4,181,547 * | 1/1980 | Speer ..................................... 156/98 |
| 4,234,369 | 11/1980 | Scheklmann . |
| 4,279,449 * | 7/1981 | Martin et al. ................... 305/35 EB |
| 4,284,451 | 8/1981 | Conley . |
| 4,303,380 | 12/1981 | Frankforter . |
| 4,347,096 | 8/1982 | Schorscher . |
| 4,465,535 * | 8/1984 | Fieldhouse et al. ................... 156/97 |
| 4,474,414 | 10/1984 | Tokue . |
| 4,544,427 | 10/1985 | Hausch . |
| 4,756,678 | 7/1988 | Magee . |
| 4,917,741 | 4/1990 | Thies et al. . |
| 4,931,004 | 6/1990 | Fogarasi et al. . |
| 4,978,403 | 12/1990 | Kinyon . |
| 5,104,476 | 4/1992 | Yamada et al. . |
| 5,133,653 | 7/1992 | Kubota et al. . |
| 5,247,981 | 9/1993 | Benedicto, Jr. et al. . |
| 5,296,173 | 3/1994 | Dornan . |
| 5,312,203 | 5/1994 | Kaji et al. . |
| 5,445,508 | 8/1995 | Kubo et al. . |
| 5,492,464 | 2/1996 | Irie . |
| 5,536,464 | 7/1996 | Muramatsu . |
| 5,653,835 * | 8/1997 | Glen ........................................ 156/98 |
| 5,736,084 | 4/1998 | Uchida et al. . |

FOREIGN PATENT DOCUMENTS

| | | |
|---|---|---|
| 2 707 536 | 1/1995 | (FR) . |
| 03 182889 | 8/1991 | (JP) . |
| 07 024840 | 1/1995 | (JP) . |

* cited by examiner

*Primary Examiner*—Robert P. Olszewski
*Assistant Examiner*—Michael Cuff
(74) *Attorney, Agent, or Firm*—Ray R. Yablon

(57) ABSTRACT

A system, method and apparatus to repair a flexible endless track of a track-driven vehicle such as a snowmobile increases the usable life of the track and avoids its disposal. In the preferred embodiment, a worn section of a snowmobile track is first prepared for repair by cleaning, grinding and tack gluing. Next, suitable hot vulcanizing repair materials are placed over the worn spot. Finally, a number of tools according to the invention are used to press these materials into place, and necessary heat and pressure is applied for the necessary length of time to complete the repair process.

49 Claims, 8 Drawing Sheets

SNOWMOBILE TRACK REPAIR SYSTEM, APPARATUS AND METHOD

FIELD OF THE INVENTION

This invention relates generally to the repair of rubberized materials, and specifically, to the repair of endless belt tracks for track-driven vehicles such as a snowmobile.

BACKGROUND OF THE INVENTION

Snowmobiling has become an increasing-popular winter sport throughout the United States and abroad. Modern snowmobiles are driven by so-called "endless" tracks or belts, which are essentially conveyor belts integral with the snowmobile that engage the snow or ice surface below so as to propel the vehicle in a manner that is well known in the art. In this disclosure, the terms "track" and "belt" may be used interchangeably to refer to that component of the snowmobile which is used as this key propulsion element engaging the supporting snow surface. While this disclosure will refer throughout to a "snowmobile," it is understood that this disclosure applies generally to the repair not only of snowmobile belts/tracks, but to the repair of the belts/tracks used to propel any similar track-driven vehicle.

Snowmobile tracks frequently become damaged due to their heavy-duty abuse in harsh conditions and their contact with stones, branches, pavement, and other ground objects and surfaces during their use. This damage often appears in the form of holes in the track, breakage of "studs" that comprise part of the track as well as tearing of the rubber sections into which the studs are embedded, sections of the track wearing thin, etc. At present, there does not appear to be any system, apparatus or method used to repair these tracks at all. Rather, the snowmobile user must simply purchase a brand new track to replace the old track once a certain level of wear has occurred. Not only is this expensive for the user, but it is environmentally wasteful since the used track must then be disposed of, consuming valuable landfill or similar natural resource space. It would be preferable if a worn or damaged track could simply be repaired and then remain in continued use.

Hot vulcanization was first discovered by Goodyear in 1839. This process involves subjecting a rubberized compound to elevated temperature and pressure for a predetermined period of time in order to either form a molded rubberized product in the first instance, or to effectuate repair to a section of a preexisting rubberized product.

There are many known applications of hot vulcanization today. Some of the many U.S. patents that disclose various devices and methods of hot vulcanization in connection with vehicle tires or propulsion tracks include U.S. Pat. Nos. 4,234,369; 4,279,449; 4,284,451; 4,303,380; 4,347,096; 4,756,678; 4,917,741; 4,931,004; 4,978,403; 5,058,963; 5,133,653; 5,247,981; 5,296,173; 5,312,203; 5,492,464; and 5,536,464.

Despite the proliferation of prior art in this area, there does not appear to be any prior art that in any way discloses or suggests repairing worn sections of a snowmobile track using vulcanization or, indeed, any other method (e.g., cold vulcanization, chemical compound repair, patching, transplanting), rather than simply disposing of these worn tracks. Additionally, there does not appear to be any prior art that discloses or suggests any particular methods or tools that can be used to effectuate the repair of a snowmobile tracks using hot vulcanization or similar methods. Finally, there does not appear to be any prior art disclosing or suggesting how to repair raised sections of a snowmobile track such as drive or traction "lugs."

OBJECTS OF THE INVENTION

It would therefor be desirable to repair worn snowmobile (and track-driven vehicle) tracks so that these tracks do not have to be discarded and can instead be reused.

It would further be desirable to have an apparatus, system and method for so-repairing these worn snowmobile (and track-driven vehicle) tracks so that these tracks do not have to be discarded and can instead be repaired and reused.

It would further be desirable to have an apparatus, system and method for repairing raised surface features of a snowmobile track such as the drive lugs.

Since snowmobile tracks may vary somewhat from one vehicle or track design to the next, it would further be desirable to have an apparatus, system and method that can be used for snowmobile track repair generally, irrespective of the particular vehicle or its track design.

SUMMARY OF THE INVENTION

In the preferred embodiment, a worn section of a snowmobile track is first prepared for repair by cleaning, grinding and tack gluing. Next, suitable hot vulcanizing compounds are placed over the worn spot. Finally, a number of tools according to the invention are used to press these compounds into place with suitable pressure, and necessary heat is applied for an appropriate length of time to complete the repair process.

BRIEF DESCRIPTION OF THE DRAWING

The features of the invention believed to be novel are set forth in the appended claims. The invention, however, together with further objects and advantages thereof, may best be understood by reference to the following description taken in conjunction with the accompanying drawing(s) in which:

FIG. 8 illustrate the vulcanization process according to the invention utilizing the various tools described in FIGS. 2 through 7.

DETAILED DESCRIPTION OF THE PREFERRED EMBODIMENT OF THE INVENTION

Figure 1:
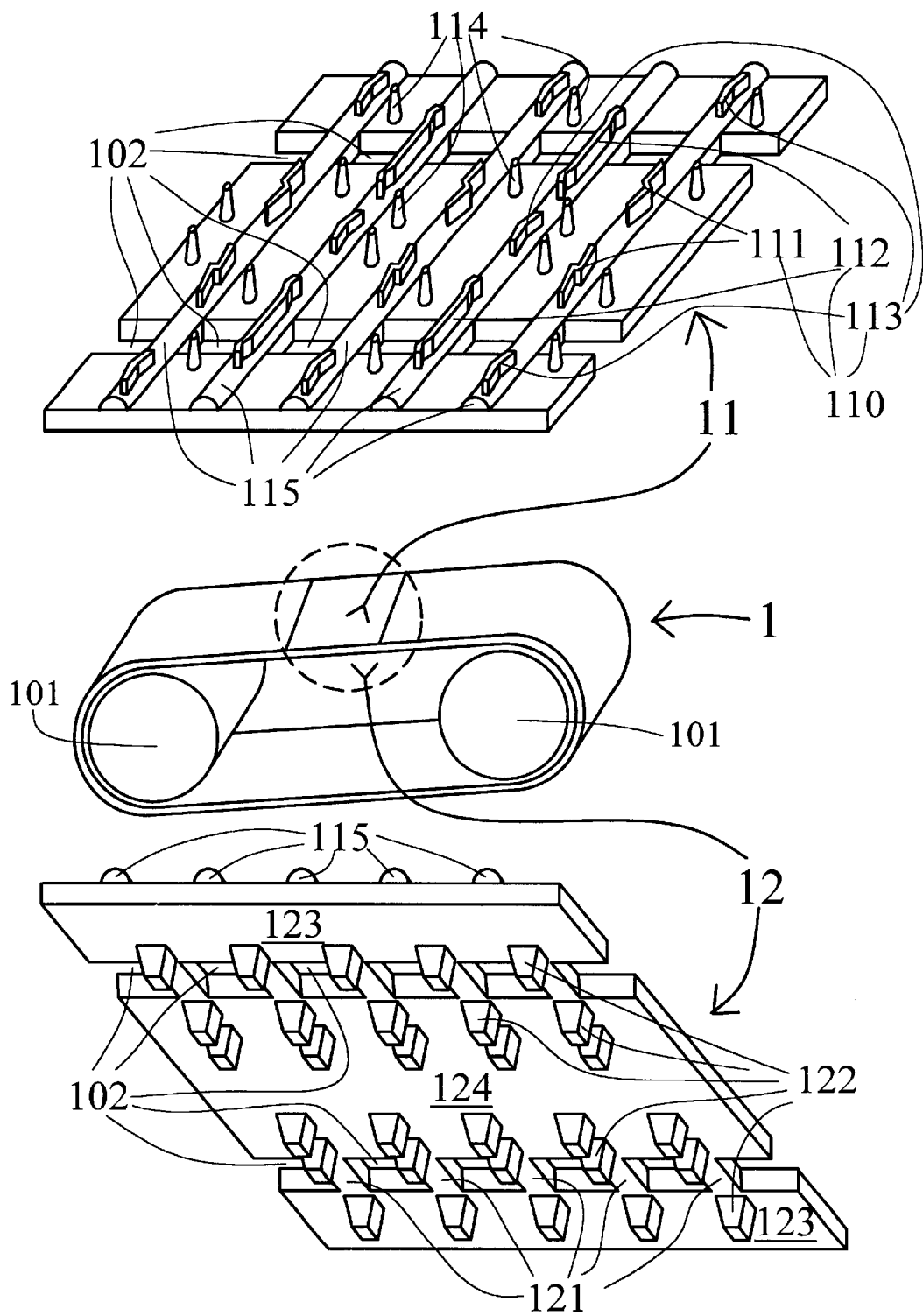
FIG. 1 illustrates a typical snowmobile track in perspective view, with a representative section of this track enlarged to illustrate the detailed surface configuration of the track on both its inner and outer track surfaces.

FIG. 1 illustrates a snowmobile drive track 1 in perspective view. Track 1 is essentially an endless conveyor belt which is driven by the snowmobile and which engages the ground beneath the snowmobile to propel the snowmobile in a forward or backward direction, in a manner well-known in the art. Track 1 has both an outer track surface 11 and an inner track surface 12, which are enlarged and shown in more detail, respectively, toward the top and bottom of FIG. 1. A strong vulcanized rubber compound such as a heavy-duty square-woven fabric is the primary material from which track 1 is typically fabricated.

Inner track surface 12 is the surface which engages the snowmobile itself, and is typically driven by the rotation of snowmobile drive wheels or cylinders 101 proximate two elongated ends of track 1 as illustrated, along with "cogs" or "sprockets" necessary to drive track 1. Outer track surface 11 is the surface which engages the snow or ice surface beneath the snowmobile and by virtue of this, when track 1 is being driven, propels the snowmobile relative to the surface.

Inner surface 12, as shown in the lower enlarged drawing of FIG. 1, typically comprises a plurality of drive apertures 102 running through track 1 between the inner and outer surface 12 and 11, as well as a plurality of drive lugs 122. These apertures 102 and lugs 122 engage and mate with "negative" corresponding elements on drive wheels 101 and possibly other internal driving components (e.g., cogs and sprockets) of the snowmobile so that the belt is firmly and securely driven by the snowmobile. In other words, these are the "frictional" elements as between the track 1 and the other snowmobile components. Typically, connecting bars 121 surrounding drive apertures 102 on at least two of their four sides are reinforced with metal or a similar hard substance (often in the form of "track clips"), since connecting bars 121 are located at the point of maximum stress where the drive mechanisms within the snowmobile directly engage track 1 in order to drive it. The illustrated inner track surface configuration 12 of drive apertures 102 and drive lugs 122 has become a de facto industry standard for the inner surface 12 of most snowmobiles presently manufactured, and so this configuration has been chosen for illustration. But it is understood that a broad range of other conceivable inner surface 12 configurations can be repaired according to the invention within the scope of this disclosure and its associated claims. It is to be noted that the inner track surface has two predominant types of regions, namely, the center region denoted by 124 which resides generally between the two columns of drive apertures 102, and the two edge regions denoted by 123 which reside generally outside of the two columns of drive apertures 102, as shown.

Outer surface 11 shown in the upper enlarged drawing of FIG. 1, is the surface that contacts the snow or ice to propel the snowmobile, and so this surface typically comprises a plurality of traction lugs 110 of various shapes and configurations such as, for example, lug configurations 111 (z-lug), 112 (w-lug), and 113 (v-lug). Outer surface 11 also typically comprises a plurality of (typically metallic) traction studs 114. Traction lugs 110 are generally located atop a plurality of cross ribs 115 which bound drive apertures 102 on the same two of their four sides as connecting bars 121. Since cross ribs 115, which include connecting bars 121 when viewed from the inner surface 12, also run through that region of the track 1 where the drive mechanisms within the snowmobile directly engage track 1 in order to drive it, these are typically reinforced throughout with a reinforcement bar fabricated within the track rubber, typically made of a strong yet flexible material such as fiberglass or Kevlar®. This is in addition to any track clips as noted above. The outer surface 11 illustrated herein is typical of many snowmobile tracks 1, though there are variations that frequently occur as between particular track manufacturers and/or models. Again, it is understood that this configuration has been chosen for illustration, but that a broad range of other conceivable outer surface 11 configurations can be repaired according to the invention within the scope of this disclosure and its associated claims.

In use, snowmobile tracks 1 typically become damaged. Track sections become worn, traction studs 114 are torn out leaving holes in the track, and in general, it is commonplace for a used track to exhibit a fair number of holes and/or worn regions. While the usual practice is for the snowmobile user to simply purchase a new replacement track, a much preferable and less costly approach is to simply repair the worn or missing section using a vulcanizing process and associated tools as will now be described.

The vulcanizing system, apparatus and method according to the preferred embodiment of the invention involves preparing the worn track 1 section or sections, placing repair material 81 (see FIG. 8) in the preferred form of one or more vulcanizing patches over the worn spot on both the inner 12 and outer 11 track surfaces, and then using a set of tools according to the invention to apply pressure to, and to heat, repair material 81 on both the inner and 12 and outer 11 track surfaces, for an appropriate length of time until vulcanization forms a complete repair.

Figure 2A:
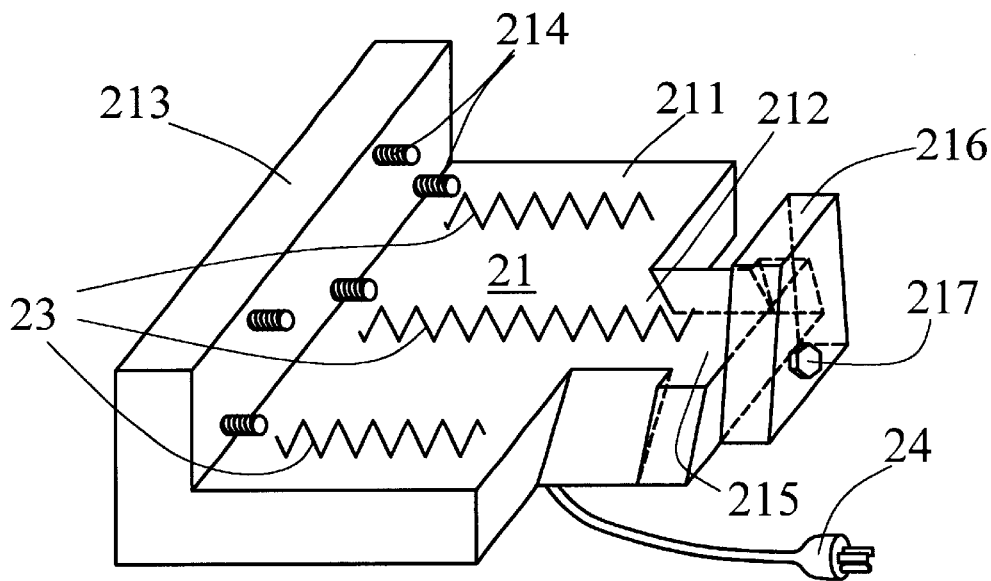
FIG. 2 illustrate in perspective view, the two primary tool configurations used to apply heat and pressure to the edge regions and the center regions of the inner track surface according to the invention.
Figure 2B:
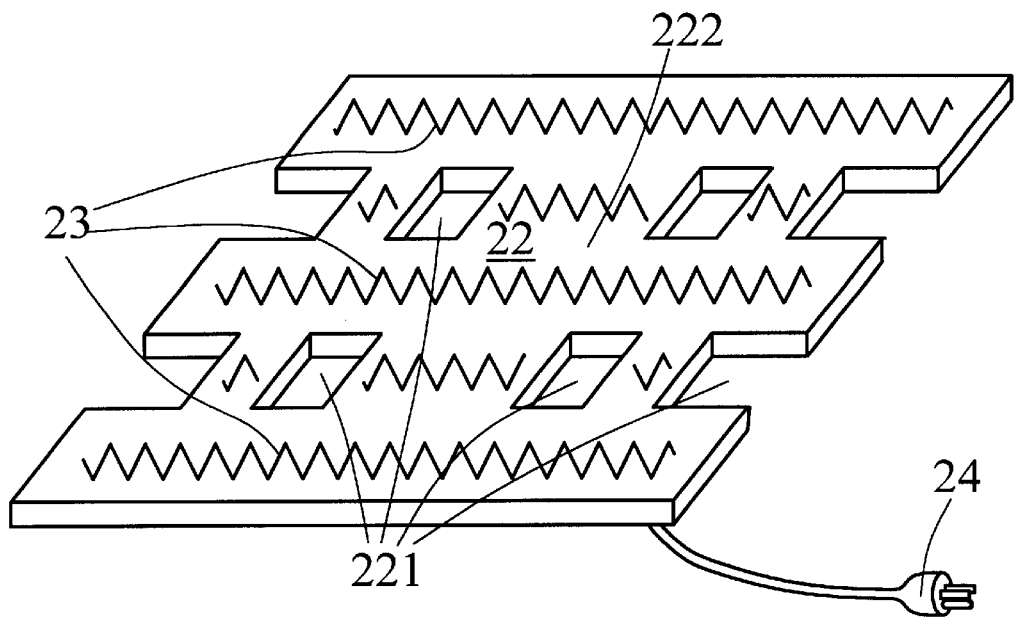

As illustrated in FIG. 2, two primary tool configurations are used to apply heat and pressure to the inner track surface 11. Inner track edge tool 21 is used to apply heat and pressure to the edge regions 123 of inner track surface 11, and inner track center tool 22 is used to apply heat and pressure to the center region 124 of inner track surface 11. Each of inner track tools 21 and 22 is fabricated from hard, highly heat-conductive material such as metal. In the preferred embodiment, each of these tools has heating element means 23 embedded within as schematically represented in FIGS. 2, so that they can be heated to the temperature necessary to facilitate vulcanization by connection to a power source, for example, via a conventional outlet plug 24. In an alternative embodiment (see, e.g. FIG. 8b), the heating element is not included within tools 21 and 22, but rather is applied to these tools by a separate heating device applying necessary heat which is then transferred to repair material 81 due to the heat-conducting composition of these tools.

Inner track edge tool 21 comprises an inner track edge pressure region 211, an inner track edge inter-drive lug pressure region 212, an inner track edge periphery clamping region 213 with one or more periphery clamping means 214 such as the illustrated adjustable screws, an inner track edge drive aperture pressure region 215, and an inner track edge drive aperture clamping region 216 connected to drive aperture pressure region 215 via drive aperture clamping means 217 such as the illustrated adjustable bolt. Several hidden surfaces are illustrated in dashed lines. Inner track center tool 22 comprises a plurality of drive lug receptacles 221, and an inner track center pressure region 222 over its entire surface area.

Figure 3:
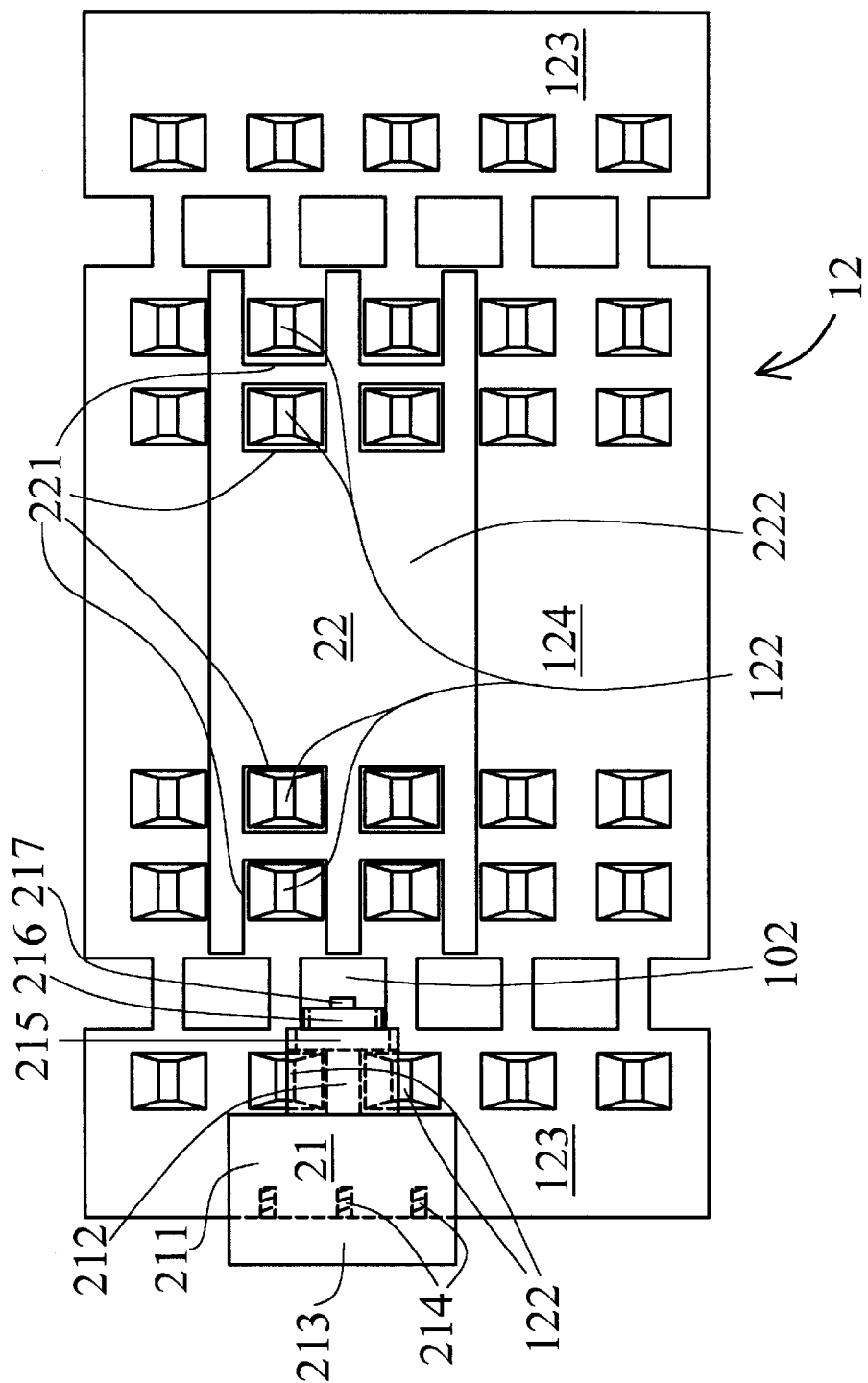
FIG. 3 illustrates in plan view, the application of the tools of FIG. 2 to the edge regions and center regions of the inner track surface to apply heat and pressure according to the invention.

FIG. 3 illustrates the placement of inner track edge tool 21 over an inner track surface edge region 123 of inner track surface 12, and of inner track center tool 22 over an inner track surface center region 124 of inner track surface 12. Whereas FIG. 2a illustrated inner track edge tool 21 from above and to the side, this is illustrated from below (the opposite side) in FIG. 3, so the hidden lines are reversed.

For inner track edge tool 21, periphery clamping region 213 resides outside (along the periphery of) inner track surface edge region 123, and inner track edge drive aperture clamping region 216 resides inside a drive aperture 102. By tightening periphery clamping means 214 and drive aperture clamping means 217, the entire inner track edge tool 21 is secured in place over repair material 81 at the repair site. The upward protrusions of periphery clamping region 213 and of inner track edge drive aperture clamping region 216 illustrated in FIG. 2 thus engage the outer edge of the inner track surface 12 and an edge of a selected drive aperture 102, operating together as the two engaging surfaces of a clamp or vice. Once this occurs, inner track edge pressure region 211 applies pressure and heat over inner track surface edge region 123, edge inter-drive lug pressure region 212 applies pressure and heat in the region between two adjacent drive lugs 122 as shown, and inner track edge drive aperture pressure region 215 applies pressure and heat to the region of inner track surface 12 most proximate the outer edge, and just to the side, of drive aperture 102, as shown.

For inner track center tool 22, drive lugs 122 protrude through drive lug receptacles 221 as shown, and inner track center pressure region 222 covers and is used to apply pressure and heat to entire inner track center region 124 and any repair material 81 placed thereon, except for where drive lugs 122 protrude through drive lug receptacles 221. Drive lug receptacles 221 are thus used to enable inner track center pressure region 222 to make the necessary pressurized contact with the surface of inner track center region 124 so that vulcanizing can take place. While drive lug receptacles 221 are illustrated as apertures, it is understood that any type of recesses upon inner track center tool 22 that accommodate drive lugs 122 and allow center pressure region 222 to provide suitable pressure against inner track center region 124 are acceptable substitutes/equivalents for the illustrated drive lug receptacles 221.

In essence, inner track edge tool 21, inner track center tool 22, and the other tools to be similarly described below, operate as "molds" designed to provide a "negative" image of various topological surface features of snowmobile track 1, which are used to press a repair material 81 against the repair site so that appropriate heat and pressure can be applied for vulcanizing repair. The particular configurations described above for inner track edge tool 21 and inner track center tool 22 are thus determined in reference to, and so as to provide a "negative mold" for, the particular inner track surface 12 shown in FIG. 1, which again, is presently an industry standard. But it is understood that the development of other tools similarly designed as negative vulcanizing repair molds for inner track surface 12, whether they be for the surface illustrated in FIG. 1 or for another non-standard inner track surface, is an obvious substitution for and a full equivalent of the inner track edge tool 21 and inner track center tool 22 shown and described above, and is thus within the scope of this disclosure and its associated claims.

Figure 4:
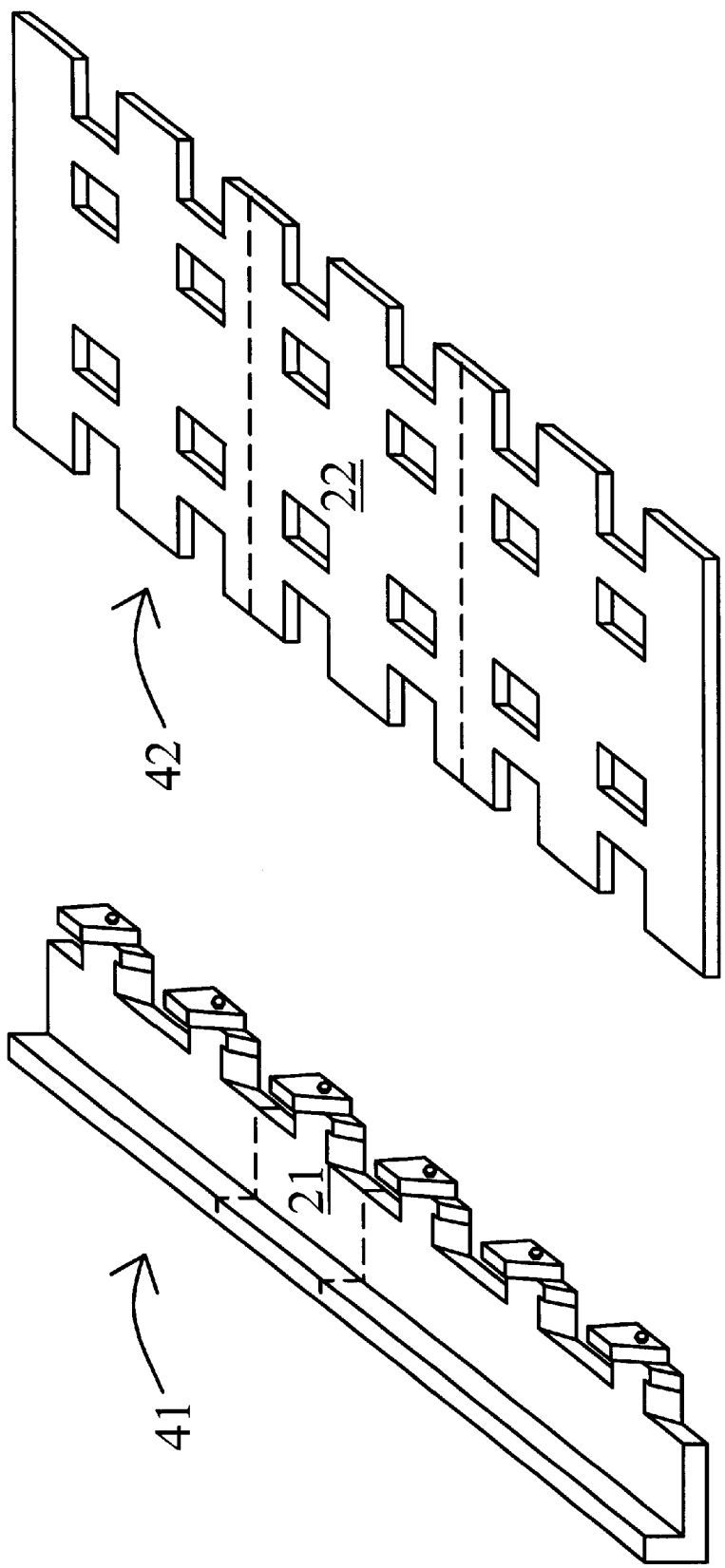
FIG. 4 illustrate in perspective view, extensions of the primary tool configurations of FIG. 2 to apply heat and pressure to a longer sections of the edge and center regions of the inner track surface according to the invention.
Figure 5:
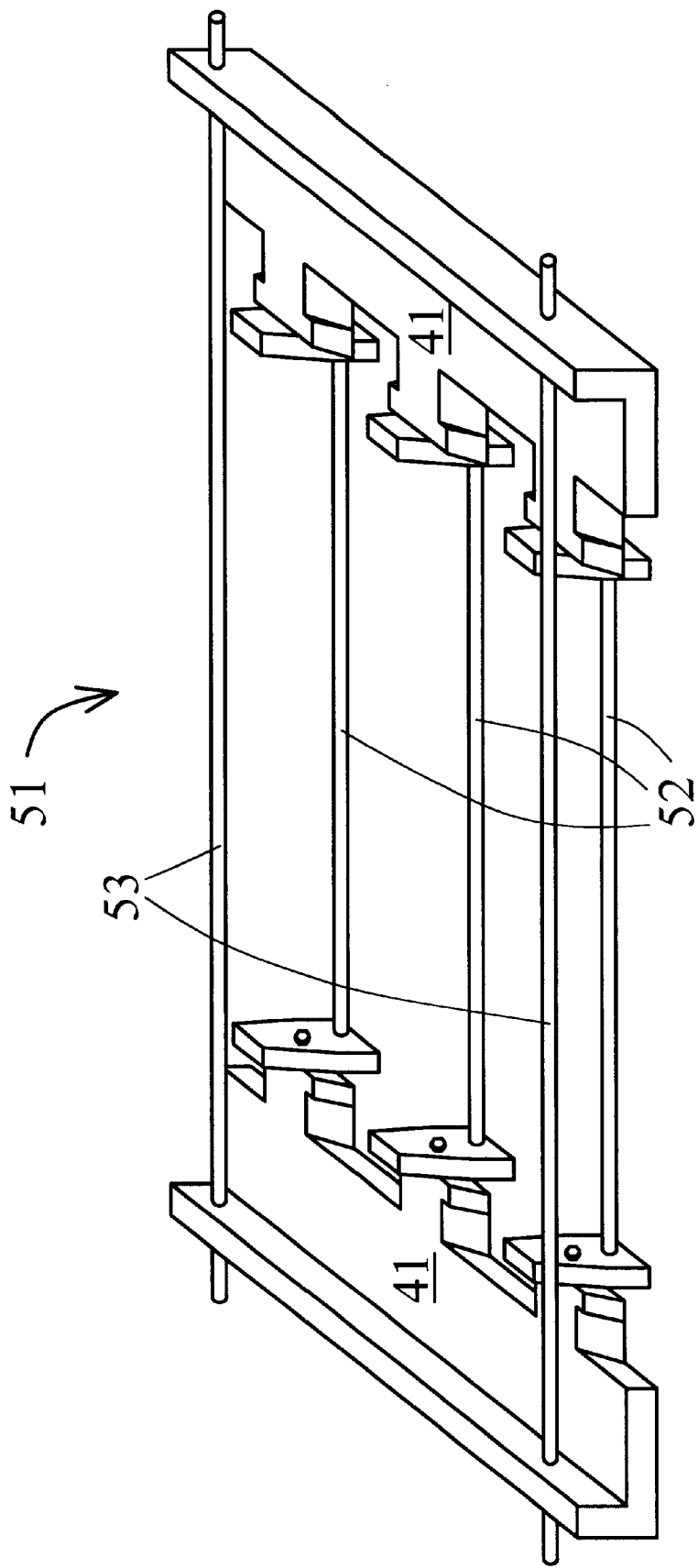
FIG. 5 illustrates in perspective view, a variation of the tool configurations of FIGS. 2 through 4 used to apply heat and pressure to the edge regions of the inner track surface according to the invention.

FIGS. 4 and 5 in fact illustrate particularly useful variations of the tools illustrated and described in FIGS. 2 and 3, which in particular, enable vulcanizing to be performed over a longer region of snowmobile track 1. FIG. 4a illustrates an extended inner track edge tool 41 which simply comprises a plurality (in this exemplary illustration, six) of inner track edge tool 21 sections (one such section is highlighted by dashed lines) conjoined in series as shown. This tool is used to easily repair longer sections of inner track edge 123, and in its preferred embodiment also comprises powered (24) heating elements 23 within, as earlier shown and described. FIG. 4b illustrates an extended inner track center tool 42 which simply comprises a plurality (in this exemplary illustration, three) of inner track center tool 22 sections (one such section similarly illustrated by dashed lines) also conjoined in series as shown. This tool is also used to easily repair longer sections of the inner track center 124, and in its preferred embodiment also comprises powered (24) heating elements 23 within, as earlier shown and described.

FIG. 5 illustrates a dual inner edge tool 51, in which a pair of extended inner track edge tools 41 each with a plurality (in this exemplary illustration, three) of inner track edge tool 21 sections is joined together by a plurality of inner 52 and outer 53 adjustable edge connectors such as the illustrated bars. In use, one of these extended inner track edge tools 41 is placed along an inner track edge region 123 as earlier shown and described, and the other is placed against the second (opposite) inner track edge region 123. Then inner edge connectors 52 are used to connect the two inner track edge tools 41 together astride the inner track surface 12, while outer edge connectors 53 are used to connect the two inner track edge tools 41 together astride the outer track surface 11. Heat and pressure are then applied to any repair material 81 on inner track surface 12, as earlier described.

Again, FIGS. 2 through 5 are simply illustrative of the types of tools that can be used to apply heat and pressure to inner track surface 12 for vulcanizing repair, and not by any means exhaustive. Many modifications and changes will occur to those skilled in the art which are intended to fall within the scope of this disclosure and its associated claims.

Figure 6:
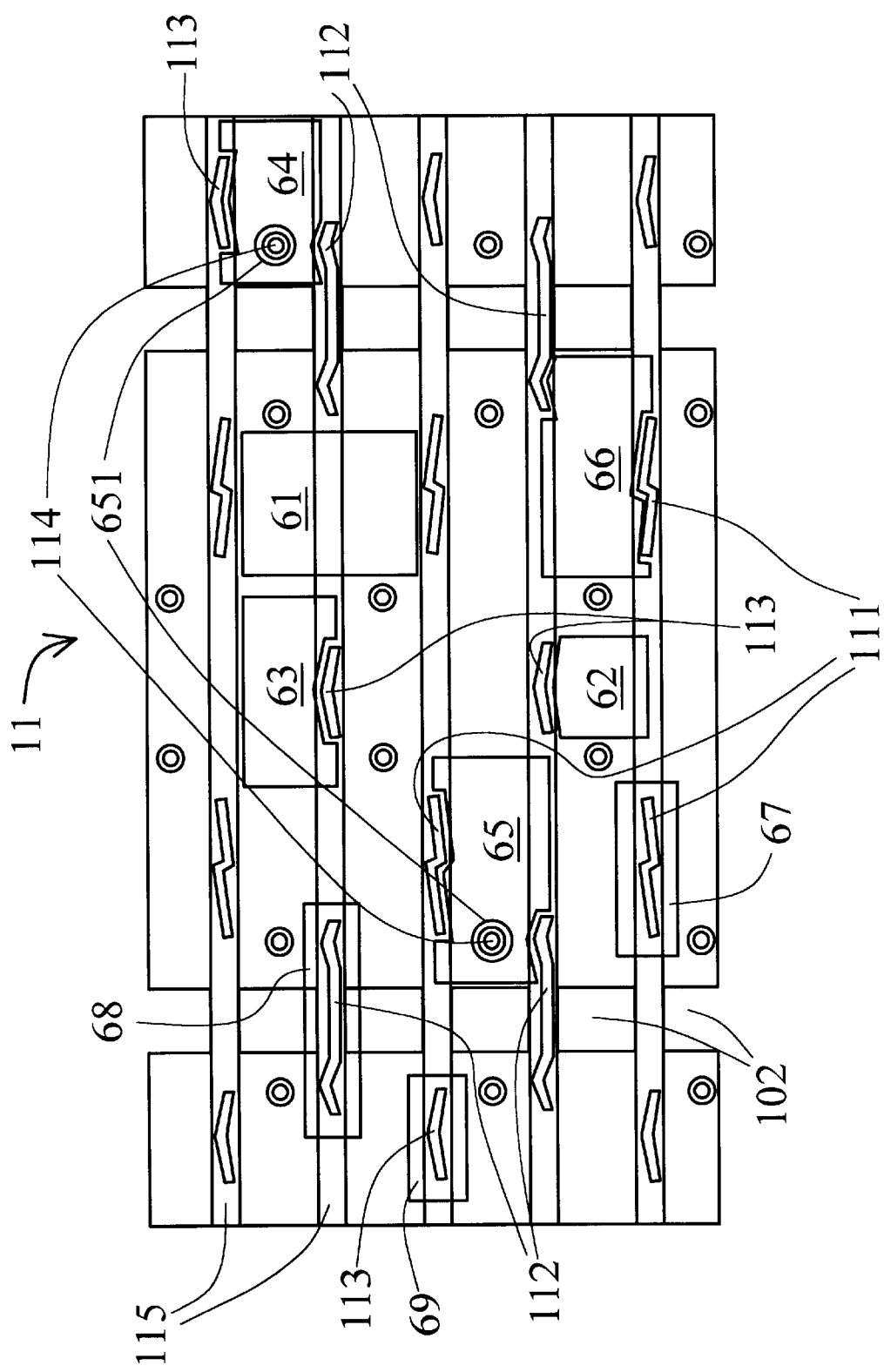
FIG. 6 illustrates in plan view, the application of various illustrative tools to apply heat and pressure to the outer track surface according to the invention.
Figure 7:
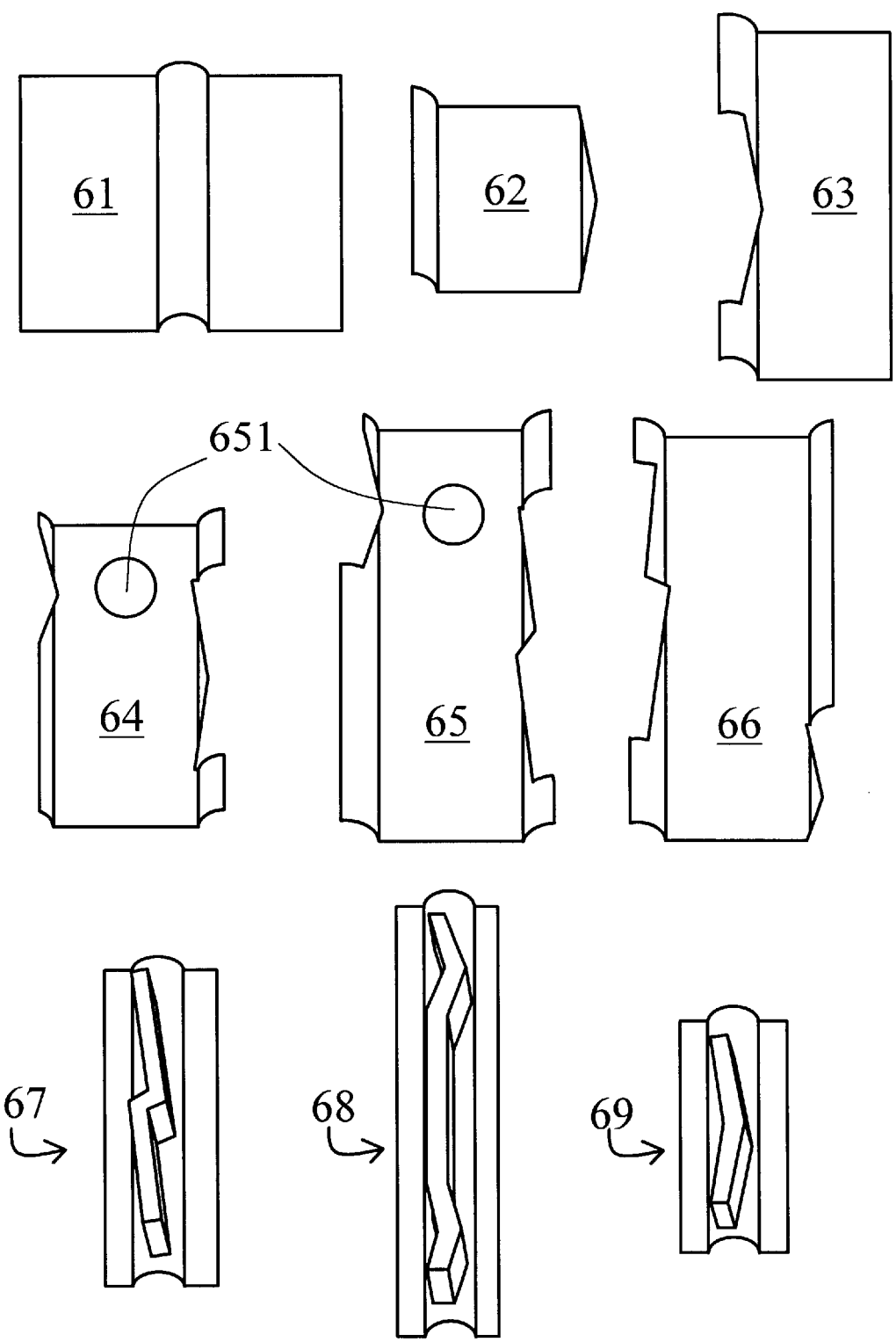
FIG. 7 illustrates the various illustrative tools of FIG. 6 in perspective view.

FIG. 6 illustrates in plan view, the application of various pre-contoured tools (heat and pressure plates) to apply heat and pressure to outer track surface 11 according to the invention. Because the surface topology of outer track surface 11 varies considerably more than that of inner track surface 12, the application of vulcanizing pressure and heat to outer track surface 11 is achieved with a wider range of tools that, similarly to what was done for inner track surface 12, are configured as "negative molds" for various regions of outer track surface 11. FIG. 7 illustrates these same tools as FIG. 6, but in perspective view, and independently of their application to outer track surface 11. In the preferred embodiment, similarly to the earlier-discussed inner surface tools 21 and 22, each of these tools is fabricated from a highly heat-conductive material such as metal, and has a powered (24) heating element 23 within as in FIG. 2, though to eliminate unnecessary clutter from the drawings, these are not expressly shown here. FIG. 7 illustrates the part of these tools that contacts outer track surface 11, and it is understood that a thicker housing than is illustrated here may be needed to enclose heating elements 23. In an alternative embodiment (e.g. FIG. 8b), as noted above, an external heat source is applied to these tools.

Referring to FIGS. 6 and 7, cross rib and track repair tool 61 is molded to, and is used to repair, a damaged cross rib 115 region without any other topological features, i.e., without any traction lugs 110, as well as the outer track region on either side of cross rib 115. This is also be used where one or more traction lugs 110 have been torn off a cross rib 115, to first repair damaged cross rib 115 prior to later repair of the missing lug(s) 110. Inner v-lug track repair tool 62 and outer v-lug track repair tool 63 are molded to and respectively used to repair a damaged section of outer track surface 11 proximate the inner and outer region of a v-shaped traction lug 113, as shown. V/w-lug track repair tool 64 is molded to and respectively used to repair a damaged section of outer track surface 11 between a v-shaped traction lug 113 and an w-shaped traction lug 112, as shown. W/z-lug track repair tools 65 and 66 are molded to and respectively used to repair a damaged section of outer track surface 11 between a w-shaped traction lug 112 and an z-shaped traction lug 111, as shown. Since repair tools 62 and 63 are used to repair track surfaces adjacent to drive lugs 110 proximate one side only, and do not have "cuts" for drive lugs 110 on opposite sides, this type of tool will be referred to as a single-side lug track repair tool. Since repair tools 64, 65, and 66 have cuts on opposite sides to repair the track surface between lugs 110 on adjacent cross ribs 115, i.e., between lugs 110 on both sides, this type of tool will be referred to an inter-lug track repair tool. Finally, z (67), w (68) and v (69) lug repair tools (molds) are respectively molded directly to and used to repair each of z (111), w (112), and v (113) shaped traction lugs, by stacking a plurality of layers of repair material 81 and then applying heat and pressure to vulcanize, as will be described shortly in further detail.

Insofar as traction studs 114 are concerned, it is quite common for these to already be missing from the section of outer track surface 1 to be repaired before repair begins, since it is in fact the tearing out of a stud 114 and the adjacent track 1 surface that is often the direct cause of the need for repairs. Thus, all of the track repair tools 61 through 66 and any similar tools that might become apparent to one of ordinary skill do not have any holes therein, in the preferred embodiment. However, for the situation where a stud 114 is intact proximate a region to be repaired, and if it is desired to not purposefully remove that stud 114 prior to repair, then each of track repair tools 61 through 66 and any similar tools that might become apparent to one of ordinary skill can also be provided with appropriate stud receptacles 651, such as has been shown for v/w-lug track repair tool 64 and w/z-lug track repair tool 65. It is understood that while stud receptacles 651 are illustrated as apertures, any suitable configuration for stud receptacles 651 that avoids interference by studs 114 with the application of pressure by the pertinent track repair tool is fully within the scope of this disclosure and its associated claims.

Again, many variations of the configuration of these tools may occur to someone of ordinary skill within the scope of this disclosure and its associated claims. And, since the outer track surfaces 12 of snowmobile tracks 1 may vary somewhat and do not typically follow a particular industry standard, it is understood that all of the outer track repair tools 61 through 69 are illustrative only, and that the development by someone of ordinary skill of variations on these tools in order to accommodate a particular outer track surface 12 topology is fully contemplated by this disclosure and its associated claims.

Finally, FIG. 8 illustrate the method by which these tools are used to repair endless belt tracks 1 for a track-driven vehicle such as a snowmobile. FIG. 8*a* shows this method in the preferred embodiment wherein the various tools described in connection with FIGS. 2 through 7 comprise their own internal heating element 23. FIG. 8*b* shows this method in the alternative embodiment where separate vulcanizing heating blocks 82 comprising their own heating elements 23 are used to supply heat.

First, the track 1 surface area or areas to be repaired are cleaned with any appropriate commercially-available rubber cleaning fluid, then dried, and then ground using a grinding tool to rough up the surface. Next, any appropriate rubber adhesive compound such as glue or cement known in the art is applied to the area to fill in microscopic gaps in the roughed up area, and is allowed to dry to a light tack for about 10 to 20 minutes. This completes the preparation of the surface(s) to be repaired.

Next, repair material 81 is put in place over the area to be repaired. In the preferred embodiment, repair material 81 is a hot vulcanizing patch with heavy-duty internal square stitched/woven fabric for added strength, cut to the required shape and size. For example only, and not limiting, a suitable material for repair material 81 might typically have a specified cure rate of approximately 30 to 40 minutes at approximately 280 degrees Fahrenheit, with a high-tensile nylon cord fabric in a 840/2 & 1260/2 Leno Weave, 300% modulus of approximately 1250 psi, tensile strength of 2750 psi, and 450% elongation at breakpoint. (It is to be noted that the curing time according to the repair material 81 technical specifications may not be the optimal curing time according to the invention, as this depends on the specific track repair work being done and such factors as the size of the repair and how much repair material 81 needs to be applied.) Repair material 81 might also include a hot vulcanizing patch of any other technical specification as well, so long as it provides the durability necessary for endless belt tracks 1 for a track-driven vehicle such as a snowmobile. Fiber gums, cushion gums, tread gums, and all-purpose repair cords are other examples of suitable, though less-preferred repair materials. Chemical patching (including A+B type cure gums) and cold vulcanization using the tools and methods disclosed herein are also within the scope of the invention, though again, are less preferred. Even a transplant of a track section, "sutured" to the track 1 using the tools and method of this invention, is within the scope of the invention, though again, this is also less preferred.

If the repair material 81 used is indeed some variety of heavy-duty square-woven fabric as is preferred, then it is to be noted that the loose fabric ends of this type of material can fray over time during repeated snowmobile (or tracked vehicle) use. Thus, once repair material 81 is in place, an optional coating of finishing compound 85 such as standard cushion gum or similar compound over repair material 81 is also advised. Once vulcanizing is complete, finishing compound 85 will provide a smoother overall finish, and will better bind the fabric ends of repair material 81 thereby avoiding degradation of repair material 81 over time due to fraying at it ends.

Once repair material 81 and any finishing compound 85 thereover is thus in place, the various tools described in FIGS. 2 through 7, as appropriate, are placed on opposite side of track 1, namely, outer track surface 11 and inner track surface 12, applying pressure directly to repair material 81 and finishing compound 85, in the manner earlier described in detail. One or more of the inner surface tools 21, 22, 41, 42, 51 or suitable variations thereof are utilized for inner surface 12. One or more of the contoured outer surface tools 61 through 69 or suitable variations thereof are utilized for outer surface 11. These are then pressed firmly into place using pressure (clamping/vice) means such as the illustrated c-clamp 83 so as to apply suitable pressure for the vulcanizing process. Finally, heat is applied from heating elements 23, and the repair material 81 and any finishing compound 85 is "cooked" (and generally cured for non-heat processes) for a suitable length of time, typically anywhere from 20 minutes to 3 or more hours, usually from 30 minutes to 2.5 hours, or from 1 to 2 hours, and on average, for about 1.5 hours. The exact time length depends on such factors as the size of the area being repaired and the quantity of repair material 81 that needs to be cooked, as well as the technical cook time specifications of repair material 81. Thereafter, the vulcanizing repair process is complete. After the various tools of FIGS. 2 through 8 are removed, track 1 is once again ready for use.

Finally, it is helpful to describe the applications of the tools and processes according to the invention to special situations that may be encountered in the repair process.

First, as noted above, a common cause of holes in track 1 is the tearing out of a stud 114. To repair this track tear and replace the stud, it is necessary to first repair the torn track 1 section using the tools and methods described above. Then a replacement stud 114, if desired, can be affixed to the repaired section using techniques known in the art for attaching studs to a snowmobile track.

Second, in the event a stud 114 is intact but the area proximate that stud 114 needs repair, there are two options. Stud 114 can be left in place as is, and a pre-contoured repair tool such as tools 61 through 69 elaborated in FIGS. 6 and 7 is used, including stud receptacles 651 such as were illustrated for tools 64 and 65. Alternatively, stud 114 can be purposefully extracted using pliers or similar extraction tools, and then the entire area proximate the removed stud is repaired using a pre-contoured repair tool 61 through 69 without any stud receptacle 651. Thus will fill the original location of stud 114 as well. Then, removed stud 114 is replaced as outlined in the preceding paragraph.

Third, to repair or replace a torn off traction lug 110, the first step is to repair any damage to the underlying cross rib 115 upon which the damaged lug 110 was seated. This would employ using cross rib and track repair tool 61 or some variation of that tool to repair the damaged section of cross rib 115, according to the methods and using the tools heretofore described. If there is no damage to the cross rib, or only nominal damage which can be addressed during the rebuilding of the traction lug, then it is not necessary to repair cross rib 115 separately from lug 110.

Figure 8A:
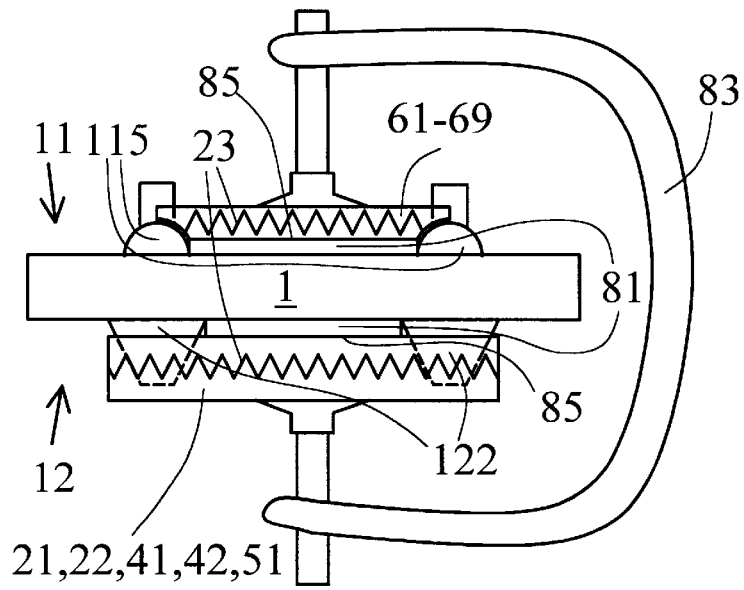
FIGS. 8a and 8b are in cross-sectional side view.
Figure 8C:
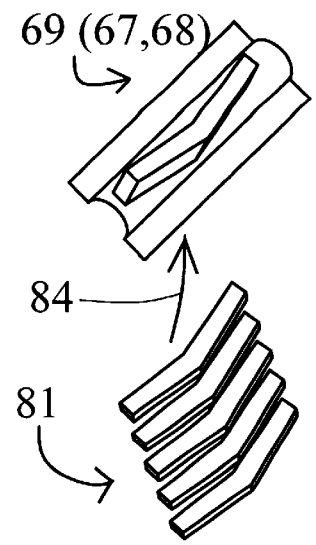
FIGS. 8c and 8d are in perspective view and particularly show lug repair.
Figure 8B:
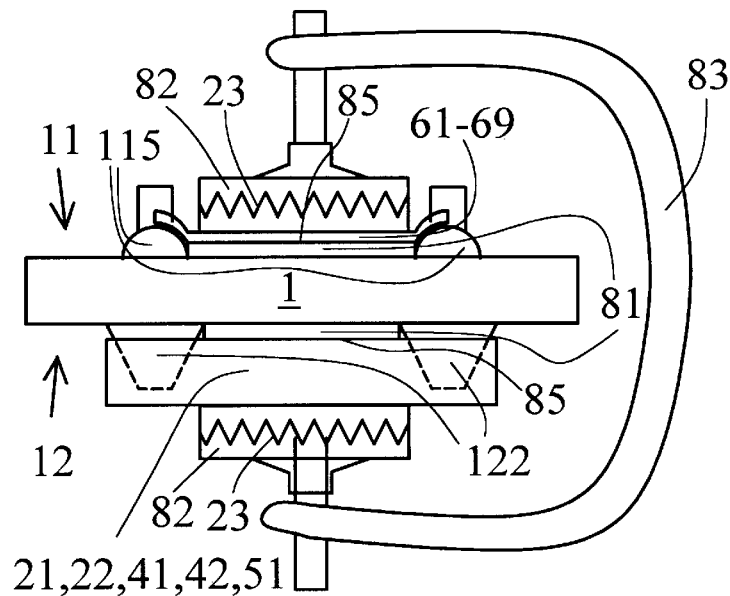
Figure 8D:
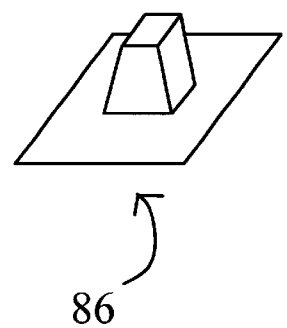

To rebuild traction lug 110, after preparing the repair site as earlier described, one cuts one or more pieces of repair material 81 into the shape of the traction lug 110 to be repaired or replaced. FIG. 8c illustrates this for v-shaped lug 113 as an example, but this discussion applies to any traction lug 110 (or drive lug 122) of any shape whatsoever. These repair material 81 pieces are then stacked atop one another as illustrated, an optional finishing compound 85 is added to cover repair material 81 as earlier described and thus avert fraying, and these pieces are then packed (84) into a matching lug repair tool such as z, w and v-shaped tools 67, 68 and 69 respectively. FIG. 8c of course uses v-shaped tool 69 since the chosen example is lug 113. Again, lug repair tools of this nature may be designed for any lug shape (including drive lugs 122) within the scope of this disclosure and its associated claims. The number of repair material 81 pieces used is determined so as to enable these pieces to be tightly packed into the lug repair tool (69 in this example), which will in turn enable proper pressure to be applied during vulcanizing. If the lug is only partially damaged, less pieces will be needed than if the entire lug needs to be rebuilt.

Once repair material pieces 81 are packed into the lug repair tool and optional finishing compound 85 is added to cover repair material 81 as earlier described, this tool in combination with the repair material 81 pieces therein is placed upon the appropriate cross rib 115, at the appropriate location. In the event only nominal repair is needed to cross rib 115, an additional patch of repair material 81 is placed under the repair material pieces of FIG. 8c which will serve to repair the cross rib itself during vulcanizing. Note that lug repair tools 67, 68, and 69 have a curved bottom surface that mates with the cross rib 115 shape and can thus be used for this purpose. Vulcanizing pressure and heat are then applied as earlier described. In essence, these lug repair tools 67, 68 and 69 act as lug molds. Once the vulcanizing is complete, the tools are removed, and the rebuilt lug is available for use.

It is important to again keep in mind that the particular repair tool configurations illustrated throughout this disclosure are examples of the types of tools that one would use to repair the track 1 of a track-driven vehicle such as a snowmobile. While many different tracks share common topological surface features and can thus be repaired with a common set of repair tools, the specific tool configurations for any particular set of repairs will depend upon the precise surface topology of the particular track 1 being repaired. The repair tools herein disclosed are fundamentally designed to provide a "negative mold" for the track section to be repaired, with additional functions (e.g. clamping, heating elements) included such as previously discussed. Thus, it is fully within the scope of this invention to design tools not expressly illustrated herein, but which embody a "negative mold" of, i.e., which mate with, the particular surface features being repaired, to repair tracks with any particular set of topological surface features, irrespective of the precise shape and size of these surface features. It is also understood that, for example, if a damaged lug 110 is to be replaced, it is perfectly acceptable to replace the original lug with a lug of a somewhat different shape and size, so long as this does not compromise the strength or drive effectiveness of track 1. Thus, the number of different shapes and sizes of repair tools can be limited by recognizing that a damaged track section need not always be repaired to precisely replicate its original visual appearance; it need only be repaired to restore its strength and it driving effectiveness.

For example, the above is to be noted in particular, as regards the repair of drive lugs 122. Other than the fact that these are located upon inner track surface 12 rather than outer track surface 11, these are repaired using a virtually identical process to that described above in connection with FIG. 8c for traction lug 110 repair. An appropriate drive lug tool (mold) 86 illustrated in FIG. 8d, similar to traction lug repair tools (molds) 67, 68 and 69 is used, but it is configured as the "negative" of a drive lug 122. Sheets of repair material 81 are cut into shapes suitable for a drive lug 122 and then stacked together such as in FIG. 8c and packed into drive lug repair mold 86. This is all placed on inner track surface 12 rather than outer track surface 11 at the necessary location (s), appropriate pressure and heat is applied, tools are removed, and the drive lug 122 repair is complete.

It is also to be noted that the term "track repair tool" as used in this disclosure is intended to apply generally to any and all of the various heat and pressure tools 21, 22, 41, 42, 51, and 61 through 69 as discussed above, as well as to any similar tools that may be designed by someone of ordinary skill for the same purpose as these aforementioned tools. Although each of these tools has been referred to by different names herein to describe their particular, specific repair function, they are all share the common feature and inventive principle of being general track repair tools that are molded to a section of track 1 to deliver pressure (and heat for hot vulcanizing) to a repair material 81 placed on that section of track 1, for the purpose of effectuating track repair.

While only certain preferred features of the invention have been illustrated and described, many modifications and changes will occur to those skilled in the art. It is, therefore, to be understood that the appended claims are intended to cover all such modifications and changes as fall within the true spirit of the invention.

We claim:

1. A method for repairing a drive track of a track-driven vehicle, said drive track comprising an inner track surface and an outer track surface, comprising the steps of:

applying repair materials comprising a hot vulcanizing compound over at least one repair location of said drive track;

placing at least one track repair tool over said repair materials, said at least one track repair tool fitted to mate with the at least one repair location proximate to which it is so-placed;

applying pressure with said at least one track repair tool, to said repair materials, for a predetermined period of cure time, until said repair materials have appropriately cured;

applying heat in addition to said pressure with said at least one track repair tool, to said repair materials, for said predetermined period of cure time, until said repair materials have appropriately cured;

applying said pressure to an edge region of said inner track surface using an inner track edge pressure region of an inner track edge tool; and simultaneously applying said pressure to a region between two adjacent drive lugs of said inner track surface using an inner track edge inter-drive lug pressure region of said inner track edge tool.

2. The method of claim 1, further comprising the step of preparing said at least one repair location prior to so-applying said repair materials, comprising the further steps of:

cleaning said at least one repair location with rubber cleaner;

allowing said rubber cleaner to dry;

grinding said at least one repair location to rough up corresponding surfaces thereof;

applying a rubber adhesive compound to the roughed up surfaces; and allowing said rubber adhesive compound to dry to a light tack.

3. The method of claim 1, comprising the further step of providing said heat using heating elements comprising part of at least one of said at least one track repair tools.

4. The method of claim 1, said step of applying said repair materials further comprising the step of applying said repair materials over a snowmobile drive track.

5. The method of claim 1, comprising the further step of simultaneously applying said pressure and said heat with said at least one track repair tool without interference by a stud of said outer track surface, using at least one stud receptacle of said at least one track repair tool.

6. The method of claim 1, omitting a step of creating said track repair tool by casting molten metal against a section of said drive track and cooling said molten metal until it hardens into said track repair tool.

7. The method of claim 1, said repair materials further comprising a hot vulcanizing compound comprising heavy-duty internal woven fabric, whereby:

said heavy-duty internal woven fabric provides added durability to said drive track once repaired.

8. The method of claim 7, further comprising the step of:

applying a finishing compound over said repair materials prior to so-applying said heat and pressure to said repair materials; whereby:

after applying heat in addition to said pressure with said at least one track repair tools, said finishing compound provides a smoother finish and binds fabric ends of said repair material to avoid degradation.

9. The method of claim 1, further comprising the steps of:

applying at least some of said repair materials to a repair location of said inner track surface between said inner track surface and said inner track edge tool; and applying said pressure and said heat to said repair materials applied between said inner track surface and said inner track edge tool, using said inner track edge tool.

10. The method of claim 1, further comprising the step of simultaneously applying said pressure to a region of said inner track surface proximate an outer edge of a drive aperture of said track using an inner track edge drive aperture pressure region of said inner track edge tool.

11. The method of claim 1, further comprising the step of clamping and securing said inner track edge tool in place over said regions of said inner track surface using an inner track edge periphery clamping region opposing an inner track edge drive aperture clamping region of said inner track edge tool, without piercing said drive track.

12. The method of claim 1, further comprising the step of simultaneously applying said pressure to a larger region of said edge region of said inner track surface than the region to which pressure is applied by a single said inner track edge tool, using an extended inner track edge tool comprising a plurality of said inner track edge tools conjoined in series.

13. The method of claim 12, further comprising the steps of:

applying at least some of said repair materials to a repair location of said inner track surface between said inner track surface and said extended inner track edge tool; and applying said pressure and said heat to said repair materials applied between said inner track surface and said extended inner track edge tool, using said extended inner track edge tool.

14. The method of claim 12, further comprising the step of simultaneously applying said pressure to said edge region of said inner track surface, and also to a second, opposite edge region of said inner track surface, using a dual inner track edge tool comprising two of said extended inner track edge tools.

15. The method of claim 1, further comprising the steps of:

simultaneously applying said pressure to a center region of said inner track surface using an inner track center pressure region substantially over an entire surface area of an inner track center tool; and simultaneously applying said pressure between adjacent drive lugs of said center region of said inner track surface using a plurality of drive lug receptacles receiving said drive lugs of said inner track surface.

16. The method of claim 15, further comprising the steps of:

applying at least some of said repair materials to a repair location of said inner track surface between said inner track surface and said inner track center tool; and applying said pressure and said heat to said repair materials applied between said inner track surface and said inner track center tool, using said inner track center tool.

17. The method of claim 16, further comprising the step of simultaneously applying said pressure to a larger region of said center region of said inner track surface than the region to which pressure is applied by a single said inner track center tool, using an extended inner track center tool comprising a plurality of said inner track center tools conjoined in series.

18. The method of claim 17, further comprising the steps of:
applying at least some of said repair materials to a repair location of said inner track surface between said inner track surface and said extended inner track center tool; and
applying said pressure and said heat to said repair materials applied between said inner track surface and said extended inner track center tool, using said extended inner track center tool.

19. The method of claim 1, further comprising the step of simultaneously applying said pressure to a drive lug of said inner track surface, using a drive lug repair mold tool.

20. The method of claim 1, further comprising the step of applying said pressure and said heat to repair materials applied to said inner track surface to build and form said repair materials into a drive lug, using a drive lug repair mold tool.

21. The method of claim 1, further comprising the step of simultaneously applying said pressure to a traction lug of said outer track surface, using a traction lug repair mold tool.

22. The method of claim 1, further comprising the step of applying said pressure and said heat to repair materials applied to said outer track surface to build and form said repair materials into a traction lug, using a traction lug repair mold tool.

23. The method of claim 1, further comprising the step of simultaneously applying said pressure to a cross rib region of said outer track surface, using a cross rib and track repair tool.

24. The method of claim 1, further comprising the step of applying said pressure and said heat to repair materials applied to a cross rib region of said outer track surface, using a cross rib and track repair tool.

25. The method of claim 1, further comprising the step of simultaneously applying said pressure to a region of said outer track surface adjacent to a single traction lug of said outer track surface, using a single-side lug track repair tool.

26. The method of claim 1, further comprising the step of applying said pressure and said heat to repair materials applied to a region of said outer track surface adjacent to a single traction lug of said outer track surface, using a single-side lug track repair tool.

27. The method of claim 1, further comprising the step of simultaneously applying said pressure to a region of said outer track surface between traction lugs of said outer track surface, using an inter-lug track repair tool.

28. The method of claim 1, further comprising the steps of applying said pressure and said heat to repair materials applied to a region of said outer track surface between traction lugs of said outer track surface, using an inter-lug track repair tool.

29. The method of claim 1, further comprising the step of:
applying said pressure to a center region of said inner track surface using an inner track center pressure region substantially over an entire surface area of an inner track center tool; and
simultaneously applying said pressure between adjacent drive lugs of said center region of said inner track surface using a plurality of drive lug receptacles of said inner track center tool receiving said drive lugs of said inner track surface.

30. A method for repairing a drive track of a track-driven vehicle, said drive track comprising an inner track surface and an outer track surface, comprising the steps of:

applying repair materials comprising a hot vulcanizing compound over at least one repair location of said drive track;
placing at least one track repair tool over said repair materials, said at least one track repair tool fitted to mate with the at least one repair location proximate to which it is so-placed;
applying pressure with said at least one track repair tool, to said repair materials, for a predetermined period of cure time, until said repair materials have appropriately cured;
applying heat in addition to said pressure with said at least one track repair tool, to said repair materials, for said predetermined period of cure time, until said repair materials have appropriately cured;
said repair materials further comprising a hot vulcanizing compound comprising heavy-duty internal woven fabric, whereby:
said heavy-duty internal woven fabric provides added durability to said drive track once repaired;
applying a finishing compound over said repair materials prior to so-applying heat and pressure to said repair materials; whereby:
after applying heat in addition to said pressure with said at least one track repair tools, said finishing compound provides a smoother finish and binds fabric ends of said repair material to avoid degradation.

31. The method of claim 30, further comprising the step of preparing said at least one repair location prior to so-applying said repair materials, comprising the further steps of:
cleaning said at least one repair location with rubber cleaner;
allowing said rubber cleaner to dry;
grinding said at least one repair location to rough up corresponding surfaces thereof;
applying a rubber adhesive compound to the roughed up surfaces; and
allowing said rubber adhesive compound to dry to a light tack.

32. The method of claim 30, comprising the further steps of:
applying said pressure to a center region of said inner track surface using an inner track center pressure region substantially over an entire surface area of an inner track center tool; and
simultaneously applying said pressure between adjacent drive lugs of said center region of said inner track surface using a plurality of drive lug receptacles of said inner track center tool receiving said drive lugs of said inner track surface.

33. The method of claim 30, comprising the further step of providing said heat using heating elements comprising part of at least one of said at least one track repair tools.

34. The method of claim 30, said step of applying said repair materials further comprising the step of applying said repair materials over a snowmobile drive track.

35. The method of claim 30, comprising the further step of simultaneously applying said pressure and said heat with said at least one track repair tool without interference by a stud of said outer track surface, using at least one stud receptacle of said at least one track repair tool.

36. The method of claim 30, omitting a step of creating said track repair tool by casting molten metal against a section of said drive track and cooling said molten metal until it hardens into said track repair tool.

37. The method of claim 32, further comprising the steps of:
applying at least some of said repair materials to a repair location of said inner track surface between said inner track surface and said inner track center tool; and
applying said pressure and said heat to said repair materials applied between said inner track surface and said inner track center tool, using said inner track center tool.

38. The method of claim 32, further comprising the step of simultaneously applying said pressure to a larger region of said center region of said inner track surface than the region to which pressure is applied by a single said inner track center tool, using an extended inner track center tool comprising a plurality of said inner track center tools conjoined in series.

39. The method of claim 32, further comprising the steps of:
applying at least some of said repair materials to a repair location of said inner track surface between said inner track surface and said extended inner track center tool; and
applying said pressure and said heat to said repair materials applied between said inner track surface and said extended inner track center tool, using said extended inner track center tool.

40. The method of claim 32, further comprising the step of simultaneously applying said pressure to a drive lug of said inner track surface, using a drive lug repair mold tool.

41. The method of claim 30, further comprising the step of applying said pressure and said heat to repair materials applied to said inner track surface to build and form said repair materials into a drive lug, using a drive lug repair mold tool.

42. The method of claim 30, further comprising the step of simultaneously applying said pressure to a traction lug of said outer track surface, using a traction lug repair mold tool.

43. The method of claim 30, further comprising the step of applying said pressure and said heat to repair materials applied to said outer track surface to build and form said repair materials into a traction lug, using a traction lug repair mold tool.

44. The method of claim 30, further comprising the step of simultaneously applying said pressure to a cross rib region of said outer track surface, using a cross rib and track repair tool.

45. The method of claim 30, further comprising the step of applying said pressure and said heat to repair materials applied to a cross rib region of said outer track surface, using a cross rib and track repair tool.

46. The method of claim 30, further comprising the step of simultaneously applying said pressure to a region of said outer track surface adjacent to a single traction lug of said outer track surface, using a single-side lug track repair tool.

47. The method of claim 30, further comprising the step of applying said pressure and said heat to repair materials applied to a region of said outer track surface adjacent to a single traction lug of said outer track surface, using a single-side lug track repair tool.

48. The method of claim 30, further comprising the step of simultaneously applying said pressure to a region of said outer track surface between traction lugs of said outer track surface, using an inter-lug track repair tool.

49. The method of claim 30, further comprising the steps of applying said pressure and said heat to repair materials applied to a region of said outer track surface between traction lugs of said outer track surface, using an inter-lug track repair tool.

* * * * *